United States Patent [19]
Kennedy et al.

[11] 3,872,602
[45] Mar. 25, 1975

[54] GAUGE
[75] Inventors: William Edward Kennedy, Grosse Pointe Woods; Willard Leslie Belcher, Southgate, both of Mich.
[73] Assignee: Microdot, Inc., Greenwich, Conn.
[22] Filed: Aug. 24, 1973
[21] Appl. No.: 391,299

[52] U.S. Cl.............................. 33/199 R, 33/147 M
[51] Int. Cl. ............................................. G01b 3/48
[58] Field of Search.. 33/199, 147 N, 148 H, 147 K, 33/178 E–178 F, 148 E–148 F, 143 L, 149 J, 172 E, 174 P, 148 E–148 F, 178 R, 143 R, 147 M

[56] References Cited
UNITED STATES PATENTS
2,556,580   6/1951   Fox .................................. 33/199 R
2,984,911   5/1961   Hagar .............................. 33/178 R
3,000,101   9/1961   Giardino .......................... 33/148 H FOREIGN PATENTS OR APPLICATIONS
895,815   5/1962   United Kingdom............... 73/172 E Primary Examiner—Richard E. Aegerter
Assistant Examiner—L. Footland
Attorney, Agent, or Firm—Harness, Dickey & Pierce

[57] ABSTRACT

A gauge for checking a threaded part for gross defects in the thread such as incomplete formation or total omission of at least half a convolution of the thread. The gauge has a scissors probe which moves along the thread being checked. When a defect is encountered, the probe pivots to indicate the presence of a defect. A switch detects this pivotal movement and provides a signal.

16 Claims, 1 Drawing Figure

PATENTED MAR 25 1975
3,872,602
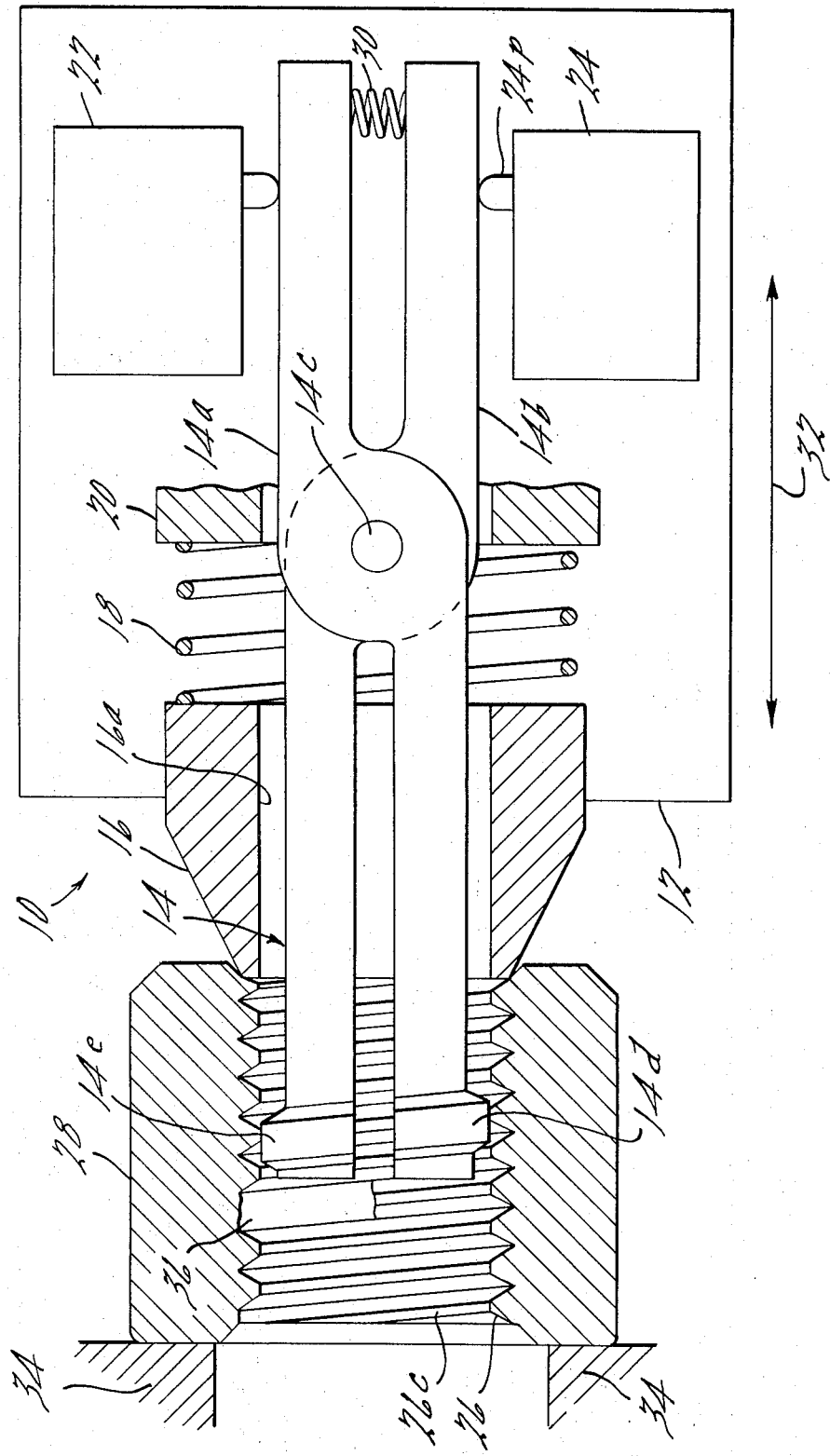

3,872,602

GAUGE

BACKGROUND AND SUMMARY OF THE INVENTION

The present invention relates to gauges and, in particular, to a gauge for checking a threaded part for a defective thread.

In the manufacture of threaded parts, especially threaded fasteners such as nuts and bolts, defects in the thread can occur for various reasons. One type of gross defect in a thread is incomplete formation, or even total omission, of a substantial portion of the thread, usually at least half a convolution of the thread. A gross defect of this type is especially undesirable in locking fasteners where after formation of the thread the fastener is further processed to enable the fastener to exhibit desired locking characteristics when put into use. Since such a defect in a fastener of this type can render the fastener incapable of attaining desired locking characteristics, the fastener becomes useless for its intended purpose. In order to eliminate further processing of a fastener having such a defect in its thread, it has been found desirable to check the thread immediately after the thread has been formed. However, one problem which confronts attempts at implementing a checking procedure where mass-produced threaded parts are to be checked on an individual basis is that the advantages arising from the use of a checking procedure may be easily outweighed by disadvantages of the checking procedure itself.

The present invention is directed to a novel gauge for checking the thread of a threaded part and is especially well suited for mass production checking of threaded fasteners on an individual basis. The present invention provides a novel gauge for quickly and accurately checking threads for gross defects such as described above. It has been found that when a gauge according to the present invention is utilized in the mass production checking of threaded fasteners, such as locking nuts, an appreciable reduction in the percentage of defective finished fasteners is attained. This greatly minimizes the chance of defective parts reaching the customer and provides a significant cost savings in spite of the initial outlay required to install one or more gauges. Furthermore, the invention principles disclosed hereafter in a presently preferred embodiment of gauge are applicable to numerous other embodiments for checking diverse types of threaded parts.

The foregoing features and advantages of the invention, along with additional advantages and benefits thereof will be seen in the ensuing description and claims which are to be taken in conjunction with the accompanying drawing.

BRIEF DESCRIPTION OF THE DRAWING

The drawing illustrates a longitudinal view, partly in section, through a gauge embodying the inventive principles of the present disclosure. The drawing illustrates a preferred embodiment of the present invention in accordance with the best mode presently contemplated for carrying out the invention.

DESCRIPTION OF THE PREFERRED EMBODIMENT

In the drawing, an exemplary but presently preferred embodiment of gauge according to the present invention is identified by the numeral 10. Gauge 10 comprises: an axially reciprocal slide 12; an axially extending probe 14 pivotally mounted on slide 12; a gauge bushing 16 affixed to one end of a compression spring 18 whose other end is affixed to a spring support 20 on slide 12; and a pair of microswitches 22 and 24 on slide 12. Gauge 10 is illustrated in the process of checking the thread 26 of a nut 28 for missing, or grossly defective, sections of thread. Probe 14 comprises a scissors mechanism having a pair of scissor elements 14a and 14b which are pivoted on slide 12 by means of a pin 14c. The forward portions of scissor elements 14a and 14b extend through the bore 16a of bushing 16 and into nut 28. Scissor elements 14a and 14b respectively are provided on the forward ends thereof with thread-engaging portions having thread contacting surfaces 14d and 14e respectively. The thread contacting surfaces 14d and 14e are contoured to the same curvature as bore 16a whose diameter is made equal to the minor diameter of thread 26. Hence, with nut 28 seated in checking position on the nose of bushing 16, the crest 26c of thread 26 and bore 16a lie on an imaginary circular cylinder. A compression spring 30 disposed between the rear ends of scissor elements 14a and 14b biases the scissor elements about pin 14c such that the thread contacting surfaces 14d, 14e are urged outwardly in opposite directions against crest 26c of thread 26. The illustrated surfaces 14d, 14e have an axial dimension substantially equal to the lead of thread 26. Surfaces 14d, 14e are so shaped to have an arcuate contour somewhat less than 180°, but it will be appreciated that other arcuate contours could be used if desired. Switches 22, 24 are positioned for actuation by elements 14a, 14b respectively when the latter pivot about pin 14c.

Gauge 10 operates in the following fashion. Initially, before a nut 28 is in the checking position, spring 18 is in its relaxed condition so that the thread contacting surfaces 14d, 14e lie within bore 16a. This is the retracted position of the gauge. A nut 28 to be checked is presently seated in checking position on the nose of bushing 16 and is backed up axially by any suitable back up means such as indicated at 34 in the drawing. Slide 12 then shifts axially (as indicated by arrow 32) to the left thereby extending probe 14 from bushing 16 as the latter is displaced relative to slide 12 against the increasing compression force of spring 18. Assuming that the initial portion of thread 26 is of the desired thread depth (i.e., the minor diameter of the thread equal to the diameter of bore 16a), surfaces 14d, 14e upon sliding axially out of bore 16a and into nut 28 do not pivot on pin 14c. So long as thread contacting surfaces 14d, 14e continue to gauge successive convolutions of the desired thread depth of thread 26, this condition is maintained. Thus if no defective convolutions have been encountered upon probe 14 being fully inserted into nut 28, switches 22 and 24 are not actuated and this indicates that the nut is satisfactory. Probe 14 then retracts to the right, as viewed in the drawing, and the nut 28 is made available for further processing. However, if thread 26 has a defective portion, such as indicated by way of example at 36 in the drawing wherein a half convolution of the thread is missing, then gauge 10 indicates this condition in the following manner. When thread contacting surface 14e encounters this defect 36, spring 30 causes scissor element 14b to pivot slightly in the clockwise direction on pin 14c. The plunger 24p of switch 24 is tripped by this pivotal movement of element 14 to actuate switch 24. Actuation of switch 24 indicates a defect in thread 26 and upon retraction of probe 14 causes the defective nut 28 to be segregated from satisfactory nuts. If scissor element 14a encounters a similar defect via its thread contacting surface 14d, switch 22 is actuated in similar fashion.

While the invention may be practiced in various embodiments other than the preferred embodiment illustrated in the drawing, the preferred scissor mechanism for the probe is especially useful in quickly and reliably checking for gross defects involving omission, or incomplete formation, of at least half a convolution of a thread. Further details such as the details of the feed mechanism for feeding nuts onto gauge 10 and the details of interconnecting switches 22 and 24 with ejecting apparatus for ejecting and segregating the nuts can be accomplished in various, well-known ways and hence have been omitted from the drawing and present disclosure for sake of clarity since these do not pertain directly to the inventive novel structure of the gauge herein disclosed. It will also be appreciated that the thread contacting surfaces 14d, 14e may be dimensioned in relation to thread 26 to provide for various degrees of sensitivity. The maximum sensitivity, however, is limited by the minimum amount of pivotal movement which switches 22 and 24 can detect. Thus, theoretically each thread contacting surface 14d, 14e could have a maximum axial dimension of twice the lead of thread 26 less slightly more than the width of crest 26c provided that switches 22 and 24 were sufficiently sensitive. In this instance, the gauge could indicate slight defects in the thread. On the other hand, the axial dimension of surfaces 14d, 14e should be at least equal to the lead of thread 26 less slightly less than the width of crest 26c to insure that the gauge does not erroneously indicate a defective thread when moving between successive convolutions of the desired thread depth.

It is to be understood that the foregoing description is that of a preferred embodiment of the invention. Various changes and modifications may be made without departing from the spirit and scope of the invention as defined by the appended claims.

What is claimed is:

1. In a gauge for checking a threaded part for a defective thread a slide movable toward and away from a support, a spring pressed bushing on said slide for locating and clamping said part on said support, the central bore of said bushing having a diameter equal to the minor diameter of the thread to be gauged, a probe supported on said slide with a pair of spring biased thread contacting surfaces which mate with the surface of the bore, spring means urging said bushing over said thread contacting surfaces when the latter is out of engagement with the thread of a part, and sensing means operated by said probe for disclosing any difference in the diameter of said thread from that of the bore after said part is accurately located and clamped and said probe is advanced from said bore into said thread.

2. In a gauge as claimed in claim 1 wherein said slide carries a pivot and wherein said probe embodies a pair of elements supported on said pivot with said thread contacting surfaces on the end of said elements which is insertable into said thread.

3. In a gauge as claimed in claim 2 wherein said thread contacting surfaces have a maximum axial dimension less than twice the lead of the thread less the width of any crest on the thread.

4. In a gauge as claimed in claim 3 wherein the minimum axial dimension of said thread contacting surfaces are greater than the lead of the thread less the width of any crest on the thread.

5. In a gauge as claimed in claim 2 wherein said probe means comprises a scissors mechanism having a pair of scissor elements with said thread contacting surfaces secured to each of said scissor elements, said bias means biasing said scissor elements to maintain each thread contacting surfaces in contact with the thread.

6. In a gauge as claimed in claim 5 wherein said thread contacting surfaces are arcuate in shape disposed on a cylinder whose diameter is substantially equal to the diameter of the thread being checked as measured across the crest of the thread.

7. In a gauge as claimed in claim 6 wherein said arcuate shaped thread contacting surfaces are disposed within the bore of said bushing until the part having the thread to be checked is located and clamped thereby and said contacting surfaces are moved thereinto from said bore into checking position.

8. A gauge as claimed in claim 6 wherein said sensing means comprising a pair of switch elements, each switch element being disposed for actuation by a respective one of said scissor elements upon pivoting thereof indicative of a defect in the thread.

9. A gauge as claimed in claim 8 wherein said switch elements are disposed for actuation by the portions of their respective scissor elements which are on the opposite side of said pivot support means from the portion of the respective scissor elements on which the respective thread contacting surfaces are disposed.

10. In a gauge as claimed in claim 1 wherein said sensing means comprises electric switch means actuable in response to movement by either or both said thread contacting surfaces.

11. In a gauge for checking a threaded part for a defective thread, means for locating and clamping a part in checking position, said means having a bore of a diameter equal to the minor diameter of the thread to be gauged, a scissors device for checking the thread having oppositely biased thread contacting elements, a slide on which said scissors elements are pivotally supported, said locating and clamping means being a spring pressed bushing mounted on said slide, said bushing when out of engagement with a threaded part extending over said scissors elements which are maintained within the bore on a diameter to be tested, and biasing means for said scissors device which urge the thread contacting elements away from each other and against the thread when moved from said bore.

12. In a gauge as claimed in claim 11 wherein the advancement of said slide means toward said threaded part accurately locates the part and clamps it to a support, and moves the probe from the bore of said bushing and into said thread which is gauged thereby.

13. In a gauge as claimed in claim 12 wherein a pair of microswitches are disposed in engagement with each said scissors element to be actuated thereby independently and simultaneously.

14. A gauge for checking a threaded part for a defective thread comprising: a locating element on which a part to be checked is adapted to be located, said locating element comprising a cylindrical surface lying on an imaginary cylinder having a diameter substantially equal to the desired diameter of the thread as measured across the crest of the thread, the threaded part being positionable on said locating element to align the crest of the thread with said cylindrical surface; a probe means having a thread contacting means thereon, said probe means being shiftable axially of said imaginary cylinder from a retracted position to a range of extended positions; means for pivotally supporting and biasing said probe means such that said thread contacting means is urged, when said probe means is in the retracted position, to contact said cylindrical surface and when said probe means is operated over said range of extended positions to contact the thread of the part being checked; said gauge being operative such that so long as said thread contacting means encounters portions of the crest of the thread lying on said imaginary cylinder as said probe means operates over its range of extended positions, said probe means remains substantially in the same pivotal position as when said probe means is in the retracted position, but when said thread contacting means encounters a portion of the crest of the thread lying on other than said imaginary cylinder said probe means pivots to a new position, said gauge including means for indicating such pivotal movement of said probe means to the new position.

15. A gauge as claimed in claim 14 wherein the gauge is adapted for checking an internal thread by having the probe means biased such that said thread contacting means is urged away from the axis of the thread and into contact with the thread.

16. A gauge as claimed in claim 14 wherein said probe means comprises a scissors mechanism having a pair of scissor elements, said thread contacting means comprising a pair of thread contacting elements, each respective thread contacting element being disposed on a respective one of said scissor elements.

* * * * *